US006754169B2

(12) United States Patent
Baum et al.

(10) Patent No.: US 6,754,169 B2
(45) Date of Patent: *Jun. 22, 2004

(54) METHOD AND SYSTEM OF OPERATION FOR A VARIABLE TRANSMISSION MODE MULTI-CARRIER COMMUNICATION SYSTEM

(75) Inventors: Kevin Lynn Baum, Rolling Meadows, IL (US); Vijay Nangia, Schaumburg, IL (US)

(73) Assignee: Motorola, Inc., Schaumburg, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 10/022,295

(22) Filed: Dec. 13, 2001

(65) Prior Publication Data

US 2003/0112744 A1 Jun. 19, 2003

(51) Int. Cl.[7] .......................... H04L 23/02; H04L 1/04; H04B 7/00
(52) U.S. Cl. ...................... 370/204; 370/206; 370/436; 375/261; 375/347; 375/130
(58) Field of Search ................................. 370/204, 206, 370/208, 436; 375/130–137, 261, 298, 308, 347

(56) References Cited

U.S. PATENT DOCUMENTS

| | | | | |
|---|---|---|---|---|
| 5,345,439 A | * | 9/1994 | Marston | 370/320 |
| 6,385,462 B1 | * | 5/2002 | Baum et al. | 455/522 |
| 6,473,467 B1 | * | 10/2002 | Wallace et al. | 375/267 |
| 2001/0008542 A1 | * | 7/2001 | Wiebke et al. | 375/141 |
| 2002/0051435 A1 | * | 5/2002 | Giallorenzi et al. | 370/335 |
| 2002/0055356 A1 | * | 5/2002 | Dulin et al. | 455/422 |
| 2002/0056066 A1 | * | 5/2002 | Gesbert et al. | 714/759 |
| 2002/0154705 A1 | * | 10/2002 | Walton et al. | 375/267 |
| 2003/0003880 A1 | * | 1/2003 | Ling et al. | 455/92 |
| 2003/0021245 A1 | * | 1/2003 | Haumonte et al. | 370/330 |

OTHER PUBLICATIONS

Antoine Chouly Americo Brajal and Sabine Jourdan, "Orthogonal multicarrier techniques applied to direct sequence spread spectrum CDMA systems," Laboratoires d'Electronique Philips, ©1998, pp. 1723–1728.

Khaled Fazel, *Performance of CDMA/OFDM for Mobile Communication System\**, German Aerospace Research Establishment (DLR), Institute for Communication Technology, ©1993 IEEE, pp. 975–979.

* cited by examiner

*Primary Examiner*—Ahmed Elallam
(74) *Attorney, Agent, or Firm*—Kenneth A. Haas

(57) ABSTRACT

The present invention provides a method of operation for a variable transmission mode multi-carrier communication system by receiving a signal, determining a link quality as a function of the received signal, and selecting a compound multi-carrier communication mode as a function of the link quality.

28 Claims, 4 Drawing Sheets

METHOD AND SYSTEM OF OPERATION FOR A VARIABLE TRANSMISSION MODE MULTI-CARRIER COMMUNICATION SYSTEM

FIELD OF THE INVENTION

In general, the present invention relates to the field of communication systems and more particularly, to multi-carrier wireless communication systems.

BACKGROUND OF THE INVENTION

Orthogonal frequency division multiplexing (OFDM) is a well-known multi-carrier modulation scheme, which can be designed to operate in broadband channels with severe multipath. For broadband channels, a receive signal processing complexity of an OFDM system is typically lower than that of an equivalent equalized single-carrier system. However, OFDM requires channel coding in order to take advantage of the frequency diversity provided by multipath channels. Without channel coding, OFDM performs as if the channel is flat faded, leading to degraded (BER) performance. Therefore, most OFDM systems include channel coding. For best performance a code rate, where code refers to channel coding, must be low enough so that the channel code is capable of exploiting all of the channel diversity. As is known in the art, the diversity capability of the channel code decreases as the code rate is increased.

In a cellular wireless communication system, the downlink received signal quality, such as the signal-to-interference-plus-noise ratio (SINR), may vary significantly depending on the location of the user and other factors. For example, a user near a base station may experience a very high SINR, while a user at the edge of a cell will experience a very low SINR.

In order to accommodate the wide range of expected SINRs' in the system, users with a high SINR can be assigned a high-order modulation and a high code rate, while users with a low SINR can be assigned a low-order modulation and a low code rate. However, this approach can still have two significant limitations. First, when the SINR is very high, the peak data rate provided by channel coded OFDM is limited by the code rate. Second, an edge-of-cell SINR can be extremely low with current aggressive cellular system frequency reuse plans; however, it is possible that even the lowest available modulation and coding rate (MCR), where coding refers to channel coding, requires a larger SINR than this edge-of cell value to provide reasonable BER performance. As a result, the system may have an unacceptably high outage probability.

One possible solution to these problems is to use multi-carrier code division multiple access (MC-CDMA) or spread OFDM (SOFDM). Code in MC-CDMA refers to spreading code. MC-CDMA typically performs better than OFDM for uncoded transmissions. But MC-CDMA suffers from self-interference if multiple spreading codes (multi-code) are transmitted over a frequency-selective (delay-spread) channel. The self-interference is due to the fact that the frequency selective channel destroys the orthogonality between the transmitted spreading codes.

Thus there is a significant need for a method and device for improving a communication system that overcomes the above disadvantages and shortcomings, as well as other disadvantages.

DETAILED DESCRIPTION OF A PREFERRED EMBODIMENT

Figure 1:
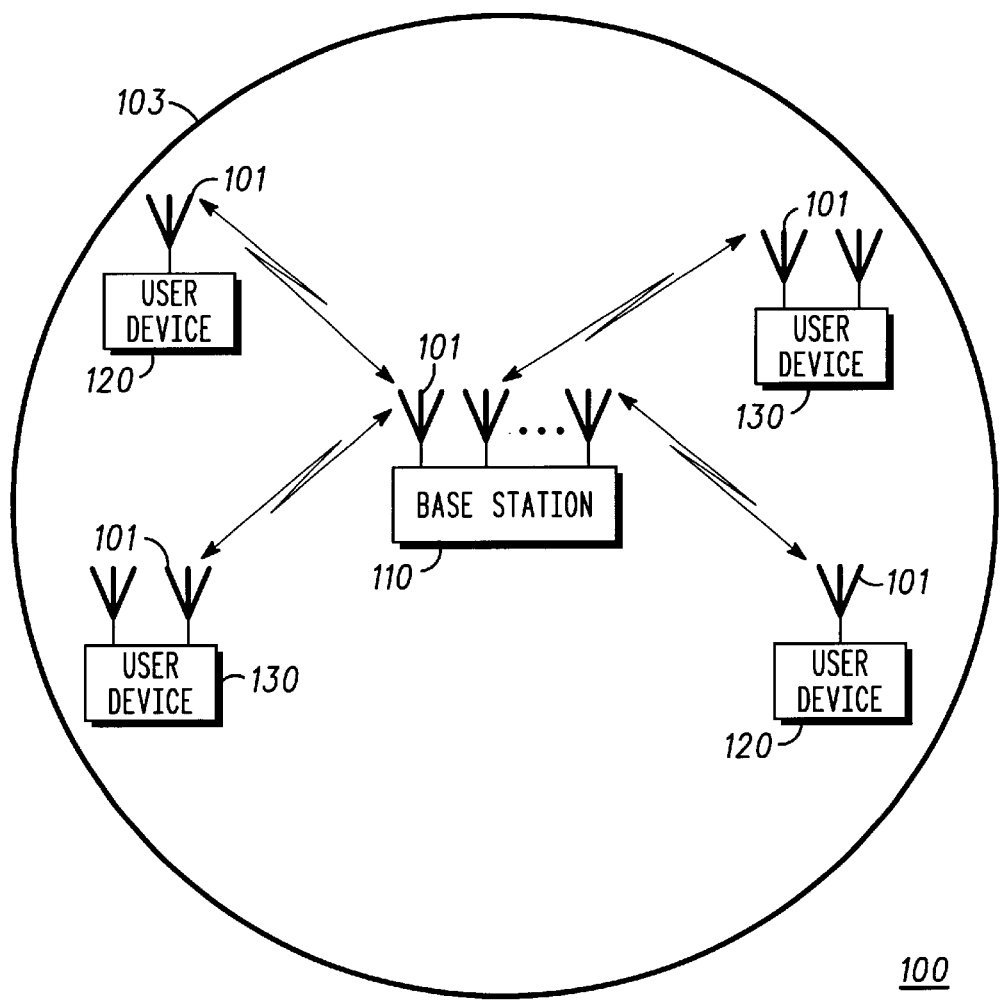
FIG. 1 is an overview diagram of one embodiment of a communication system in accordance with the present invention.

FIG. 1 illustrates a wireless communication system 100 in accordance with one embodiment of the present invention. As shown in FIG. 1, a base station 110 provides communication service to a geographic region known as a cell 103. At least one user device 120 and 130 communicate with the base station 110.

As shown in FIG. 1, user devices 120 have a single antenna 101, while user devices 130 have at least one antenna 101. One embodiment of the invention provides that the user devices 120 and 130, as well as the base station 110 may transmit, receive, or both from the at least one antenna 101. An example of this would be a typical cellular telephone. Additionally, one embodiment of the invention can be implemented as part of a base station 110 as well as part of a user device 120 or 130. Furthermore, one embodiment provides that user devices as well as base stations may be referred to as communication devices, transmitting units, receiving units, transmitters, receivers, transceivers, nodes, or any like term known in the art, and alternative transmitters and receivers known in the art may be used.

Figure 2:
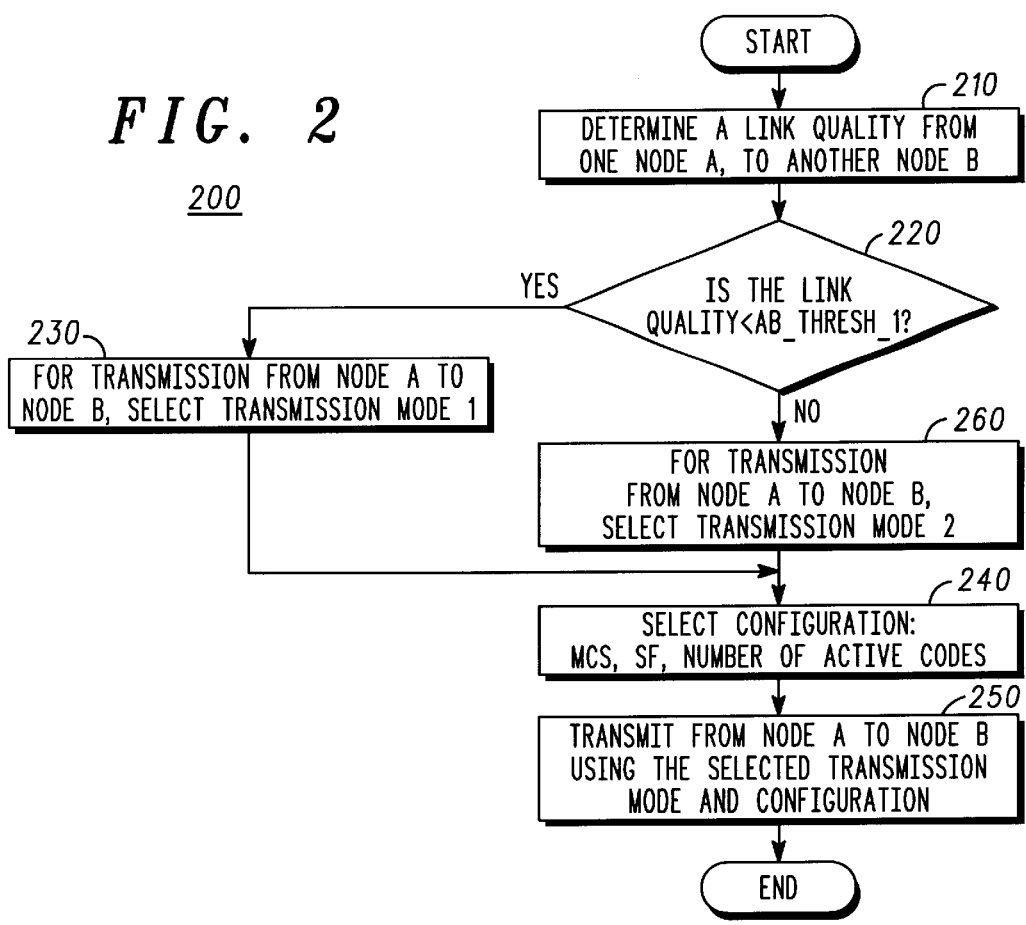
FIG. 2 is a flow chart representation of one embodiment of a transmission selection method performed by the communication system of FIG. 1, in accordance with the present invention.

FIG. 2 is a flow chart representation of one embodiment of the present invention. The embodiment may provide a compound communication mode 200 for improving the performance of the wireless communication system 100 of FIG. 1 when a link quality between multiple communication devices is below a specified threshold. There are several methods known in the art for determining the link quality 210. For example, embodiments of the invention may use a function of one or more of the following: FER (frame error rate), SER (symbol error rate), BER (bit error rate), SINR (signal to interference plus noise ratio), SIR (signal to interference ratio), SNR (signal to noise ratio) or WER (word error rate) measurements from previously received data or pilot signals or combinations thereof. Other methods known in the art for determining or measuring link quality may also be used. An example function of the BER that may be used to determine link quality is 1/BER (inverse bit error rate). Another embodiment of the invention may include making an adjustment to (adjusting) the link quality, or to a link quality threshold between communication devices, as a function of the type of data detector (detector) used by the receiver. For example, different types of detectors such as maximum likelihood and linear MMSE (minimum meansquare error), or single iteration and multiple iteration (iterative detection) can have different performance at the same SINR. In one embodiment of the invention, if a receiver measures SINR to determine link quality, the link quality can be adjusted to reflect the performance characteristics of the type of detector used in the receiver. In another example, multi-carrier with spreading and multi-carrier without spreading may have different performance characteristics, and the link quality can be adjusted to account for the type of received signal, such as with or without spreading, that is used to determine the link quality.

A further embodiment of the invention may provide for adjusting the link quality or the link quality threshold to account for the characteristics of the signal used to determine the link quality, for example normalizing for any power difference between pilots and data. In this embodiment, if pilots are used to determine the link quality of the data when the pilots are transmitted with power P1 and the data is transmitted with power P2, then the link quality determined for pilots may be adjusted to reflect the link quality on the data by accounting for the power difference ratio of P2/P1. In another embodiment of the invention, if the link quality is determined from the estimated BER or WER of a detected data signal having a modulation and channel code rate that differ from a reference modulation and channel code rate, then the adjustment of the link quality may compensate for the expected performance difference between the actual modulation and code rate and the reference modulation and code rate. The described embodiments of adjusting the link quality and link quality threshold illustrate a small sample of typical applications, and the use of a link quality adjustment is not limited to these applications. All embodiments of the invention can provide transmission selection methods that support multi-carrier transmission with spreading and multi-carrier transmission without spreading (regular multi-carrier transmission) within the same communication system 100. In one embodiment, the regular multi-carrier transmission can be orthogonal frequency division multiplexing (OFDM) and the multi-carrier transmission with spreading (multi-carrier with spreading) can be multi-carrier code division multiple access (MC-CDMA). When used on the downlink of a communication system, MC-CDMA may also be referred to as MC-CDM (multi-carrier code division multiplexing) since the transmitted spreading codes originate from a single source. Another term that describes a form of multi-carrier transmission with spreading is spread OFDM or SOFDM. SOFDM and many forms of MC-CDMA typically spread a data symbol over a plurality of subcarriers (frequency domain spreading), but the present invention is also applicable to multicarrier systems with time domain spreading, or to systems with a combination or hybrid of frequency domain and time domain spreading.

A further embodiment of the invention may select a compound communication mode appropriate for each device within the communication system 100. A compound communication mode may select appropriate parameters (e.g., regular multi-carrier or multi-carrier with spreading, modulation and coding scheme (MCS) where coding refers to channel coding, spreading factor, number of transmitted (active) spreading codes) as well as obtain and provide additional transmission and reception information, in order to provide improved performance between communication devices. Three communication mode embodiments (transmission modes) that may be part of one or more compound communication modes may be summarized as multi-carrier with spreading and fractional loading (mode-1), regular multi-carrier, which preferably includes the use of adaptive modulation and coding (AMC), where coding refers to channel coding (mode-2), and multi-carrier with spreading and full-load or nearly full-load multi-code transmission (mode-3). Multi-code refers to multiple spreading codes. For systems with spreading, the term loading is typically used to indicate the ratio of the number of active codes to the spreading factor.

Multi-carrier with spreading and fractional loading may be used when the signal to interference noise ratio (SINR) is lower than what may be required to support the lowest modulation and coding rate (MCR) of an adaptive modulation and coding (AMC) scheme, where "adaptive modulation and coding" or "AMC" includes adaptive modulation, adaptive coding, or a combination of adaptive modulation and adaptive coding. This communication mode (mode-1) can effectively expand the original AMC set to include lower modulation and coding rates (MCRs') that can operate at lower SINRs', without changes to the original set of modulation and coding schemes. For example, if the lowest MCR of the AMC set is 1, as may be provided by QPSK with rate—½ channel coding, then an effective MCR of 0.5 may be provided using MC-CDMA (or MC-CDM or SOFDM) transmission with SF/2 (where SF =spreading factor) active spreading codes (loading =0.5) and QPSK with rate—½ channel coding on each active spreading code. In this example, the transmission with an MCR of 0.5 can be detected by a receiver at a lower SINR than a transmission with an MCR of 1, thereby reducing the outage probability or number of dropped calls in the system.

Another embodiment of the invention may describe mode-1 as a multi-carrier transmission with spreading, having an effective spreading gain greater than one. Within a further embodiment of the invention, an effective spreading gain greater than one can be implemented in multiple ways including using single-code with variable spreading factor; multi-code transmission with fractional loading, or a mix of single-code and multi-code transmission where the mix can be multiplexed onto different sets of subcarriers, different time intervals, or a combination thereof. Single-code refers to the case of a single active spreading code on a particular set or subset of channel resources (such as subcarriers). For one embodiment of the invention, the spreading code can be a repetition code or well-known orthogonal codes such as Walsh-Hadamard codes, or a mapping that assigns K data symbols and (M−K) zeros to M time-frequency resources (M>K).

Mode-1 may be preferably implemented using single-code transmission with a variable spreading factor. For example, the effective MCR can be reduced by a factor of SF when a spreading factor of SF is used with single-code transmission. This may provide an effective spreading gain of $G_{eff}=SF$ to communication devices for use in bad conditions, such as edge of cell locations. An additional embodiment of mode-1 may provide that the spreading factor as well as the effective spreading gain is increased as the SINR decreases. Typical values of SF for mode-1 would be 2, 4, 8, and 16, which can effectively add 4 new MCR's to the baseline AMC scheme. These values of SF can provide effective spreading gains of 3 dB, 6 dB, 9 dB, and 12 dB, respectively.

Figure 3:
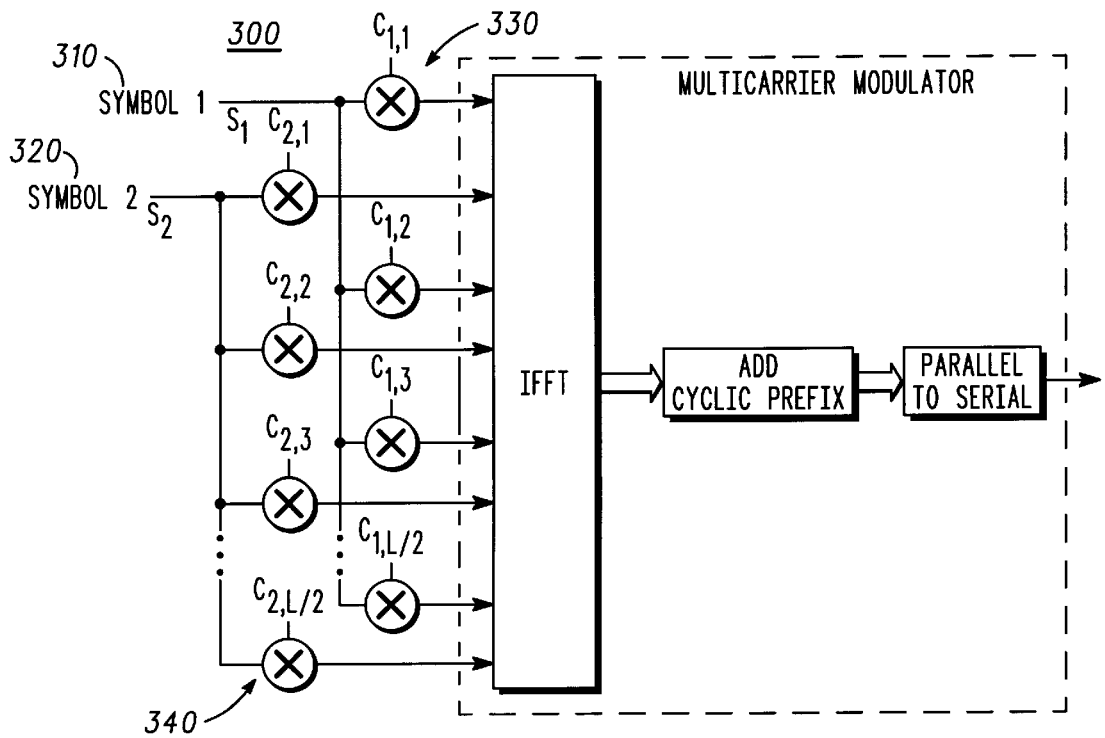
FIG. 3 is a block diagram illustrating one embodiment for multiplexing a transmission performed by the communication system of FIG. 1, in accordance with the present invention.

In another embodiment of mode-1, the symbols being transmitted to different communication devices can be simultaneously assigned to different subcarriers, different time periods, or a combination of these. The multiplexed transmission 300 illustrated in FIG. 3 is an example of this embodiment of mode-1. The multiplexed transmission 300 depicts the simultaneous transmission of two data symbols 310 and 320, where symbol 310 may be spread with a spreading sequence $c_{1,i}$ 330, and symbol 2 320 may be spread with the sequence $c_{2,i}$ 340, and the chips (c) of the two spread symbols are multiplexed onto different sets of subcarriers. The chip index represented as i, progresses to the spreading factor value L/2 for each symbol 350, where L represents the number of subcarriers. In one embodiment of the invention, the spreading factors for the symbols do not need to be equal, the number of simultaneously transmitted symbols can be different from two, and the transmitted symbols can be either for different communication devices or for the same communication device.

One benefit of the previously described single-code transmission with variable spreading factor is that multiple users with either the same or different spreading factors can be supported while remaining orthogonal (by being assigned to different sets of subcarriers, different time periods, or a combination of these). As shown in FIG. 3, a system with L subcarriers can support two simultaneous communication devices, each with SF=L/2, by assigning even-numbered subcarriers to a symbol 320 of one communication device and odd-numbered subcarriers to a symbol 310 of the other communication device. In an additional embodiment of the invention, a single communication device with SF=L/2 can transmit two data symbols per OFDM symbol period while maintaining orthogonality between the two spreading codes. A further embodiment of the invention may assign a communication device to different sets of subcarriers in different time periods to achieve a frequency hopping effect, which may provide improved interference averaging.

A further embodiment of the invention may utilize repetition as a form of single-code transmission with a variable spreading factor for Mode-1. For example, if an effective spreading gain of 2 is needed, a symbol can be transmitted twice, while if an effective spreading gain of 5 is needed, the same symbol can be transmitted 5 times, and so forth. One embodiment of the invention may represent the simplest form of repetition by setting all of the chip values of the spreading code to 1. This embodiment of mode-1 as well as the original mode-1 scheme may space the chips (or repeated symbols) by more than the subcarrier spacing for improved frequency diversity. Also, one embodiment of the invention may improve on interference averaging by providing that different cells use different spreading codes, or use different sets of subcarriers for the chips/repeated symbols. This embodiment of a repetition scheme can apply a known phase shift sequence to the repeated symbols to effectively create different spreading codes in different cells. For the embodiments using repetition as a form spreading, the repeated symbol transmissions may occur on different subcarriers, different time intervals, or a combination thereof.

A further embodiment of the invention may use for mode-1 fractionally loaded multi-code transmission in place of the previously described single-code with variable spreading factor. Within this embodiment of mode-1, single-code and multi-code transmission may be mixed. For example, a base station may transmit to one communication device using single-code with variable spreading factor and to another communication device using multi-code. Additionally, the transmissions may be made simultaneously by using different sets of subcarriers for the different destination communication devices. In another embodiment, a communication device can use single-code with variable spreading factor, while another communication device may use multi-code. In this embodiment, single-code communication devices may be assigned to different sets of subcarriers or different time periods than the multi-code communication devices. Different multi-code communication devices may also have different spreading factors.

Another embodiment of the invention can use a fixed spreading factor in Mode-1, and the number of active (transmitted) spreading codes (i.e., the loading) can be varied to change the effective spreading gain. For example, a fixed spreading factor of 32 could be selected, and the effective spreading gain may be changed by selecting the number of active (transmitted) spreading codes. For a step size of 3 dB in the effective spreading gain, the number of active spreading codes could start with 16 at $SINR_0$, and could decrease to 8, 4, 2, and finally 1 as the SINR decreases. The benefits of mode-1 using a multi-code method may include:

Potentially higher realization of frequency diversity.

Easy to mix users with different effective spreading factor requirements.

Simple per-spreading code power control capability; simple interference averaging by overlaying a scrambling code on top of the original spreading codes.

However, unlike the single-code variable spreading factor method, the spreading codes do not remain orthogonal unless the channel is invariant over the chips of the spreading code.

An embodiment of the invention providing regular channel coded OFDM with AMC (mode-2) may be used when the SINR is above the SINR required for the lowest MCR of the baseline AMC scheme ($SINR_0$) and below the SINR required for the highest-order uncoded modulation ($SINR_1$). Another embodiment of the invention may describe mode-2 as a channel coded multi-carrier transmission without spreading, or a regular channel coded multi-carrier transmission.

Another embodiment of the invention may provide Mode-2 to use full-load multi-code MC-CDMA with a small spreading factor (less than 17 and preferably less than 5). With a small spreading factor, the inter-spreading code interference may be less severe, and advanced receiver techniques such as joint detection may become feasible.

Further, one embodiment of the invention may alter mode-2 to incorporate interference averaging. When there is excess capacity in the system, for example at times when the demand for information bits is less than the transmission capability, mode-2 can be extended to include the use of OFDM interference averaging techniques. OFDM interference averaging techniques can reduce the short-term transmit power while extending the time required to transmit a given number of information bits. As a result, energy-per-bit-to-noise power density ratio (Eb/No) may be unaffected, but the transmit power spectral density may be reduced providing interference averaging.

One embodiment of the invention may switch between mode-2 and mode-3 for certain MCSs', even when the SINR is between $SINR_0$ and $SINR_1$. For example, if uncoded QPSK and uncoded 16 QAM are included in the AMC set (where the required SINR for QPSK is less than the required SINR for 16 QAM), and the required SINR for uncoded 16 QAM is $SINR_1$, then mode-3 may be used for uncoded QPSK transmission.

Mode-3 may be used by one embodiment of the invention, when the SINR is higher than $SINR_1$, and uncoded or lightly channel coded transmission is desired to obtain the maximum possible data rate. The use of spreading with multi-code in mode-3 can provide frequency diversity, and full-load multi-code transmission may provide the same data rate as a regular OFDM system. For one embodiment of mode-3, the spreading factor may be made large in order to capture all of the frequency diversity, but the loading may be one or nearly one (0.75 to less than one) since the number of transmitted spreading codes may be equal to or nearly equal to the spreading factor.

One embodiment of the invention with AMC may assign to communication devices the modulation and coding scheme (mode embodiment) that best matches the actual link quality. Another embodiment of the invention may assign communication devices the mode embodiment that is associated with an MCR, which is the number of information bits represented by each channel coded symbol. A modulation and coding scheme (MCS) can represent a specific combination of a modulation constellation and a channel code, and each MCS may have an associated MCR. The table below shows an example set of MCSs', their modulation constellation, code rate, and MCR. Typical channel codes may include convolutional codes and turbo codes.

| MCS index | Modulation constellation | Channel code rate | MCR (information bits/symbol) |
| --- | --- | --- | --- |
| 1 | QPSK | ½ | 1 |
| 2 | QPSK | ¾ | 1.5 |
| 3 | 16-QAM | ½ | 2 |
| 4 | 16-QAM | 1 (uncoded) | 4 |

Returning again to FIG. 2, after determining the link quality 210, one embodiment of the invention may compare the link quality to a threshold value 220. The threshold value, denoted as AB_thresh_1, may correspond to the minimum required link quality for the lowest MCR from the MCS set. If the link quality is less than the AB_thresh_1 value, the transmission mode-1 may be selected 230. One embodiment of the invention may provide that the selection of any transmission mode and configuration can be performed either in a first communication device (node A) or a second communication device (node B), or partly in each. For example, node B may determine the link quality and select a compound communication mode based on a function of the link quality. Node B may transmit information about the selected compound communication mode to node A so that subsequent transmissions from node A to node B may use the selected mode. The information may consist of at least one parameter of the selected compound communication mode.

If mode selection is done in node A, then node A can signal the information to node B on some type of control/signaling channel. In one embodiment of the invention, the link quality may be determined by node B and node B may transmit at least one parameter to node A as a function of the link quality, and a compound multi-carrier communication mode may be selected as an operation of node A. Another embodiment of the invention may provide that node B attempt to determine the transmission mode and configuration blindly from the received signal, such as using a preset or default mode, or comparing the received signal to predefined characteristics.

After selecting mode-1, the compound communication mode 200 may select additional configuration information 240. For one embodiment of the invention, additional configuration information may include in part or completely or in combination, from data not limited to MCS, spreading factor, and number of active spreading codes. Using the selected transmission mode-1 and the determined configuration information, data may be transmitted from node A to node B 250.

If the compound communication mode 200 determines the link quality to be more or equal to the AB_thresh_1 value, the transmission mode-2 may be selected 260, and the method may proceed to the block 240 and continue as previously described.

Figure 4:
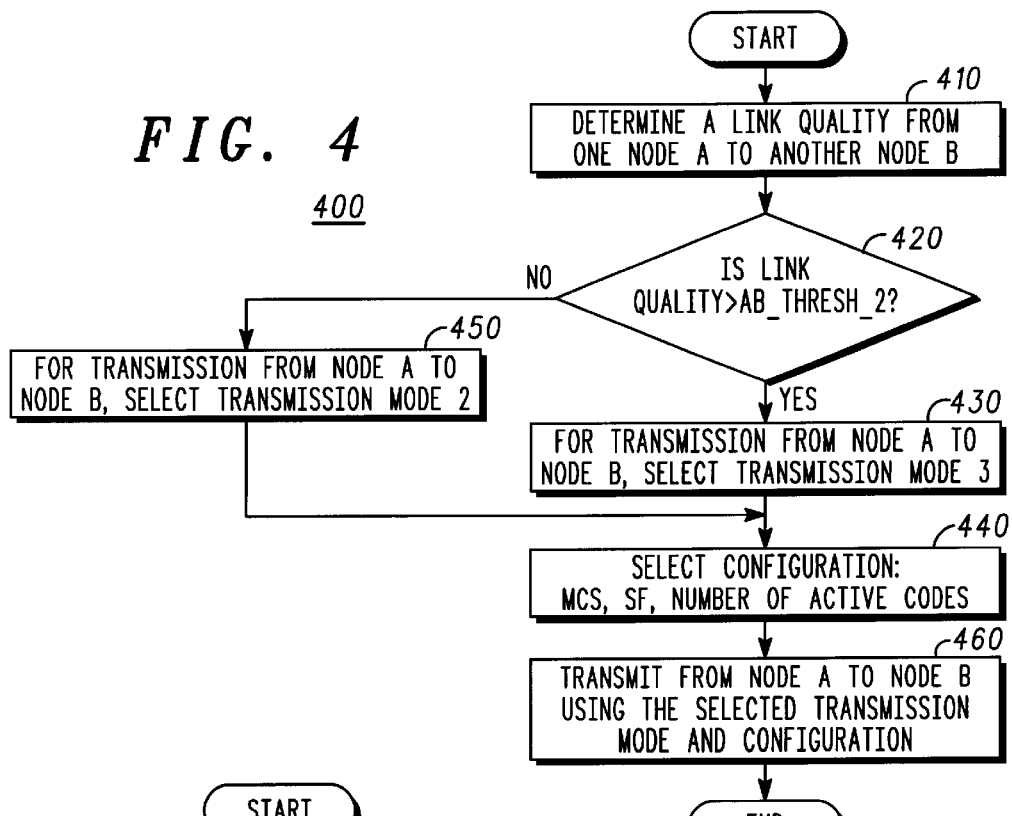
FIG. 4 is a flow chart representation of a second embodiment of the transmission selection method performed by the communication system of FIG. 1, in accordance with the present invention.

FIG. 4 is a flow chart representation of an embodiment of the present invention providing another compound communication mode 400 for improving the performance of the wireless communication system 100 of FIG. 1. After determining the link quality from one node (node A) to a second node (node B) 410, a determination may be made if the link quality is greater than a threshold AB_thresh_2 420. The threshold value, denoted as AB_thresh_2, may correspond to the required link quality for the highest rate MCR (from the MCS set) for which mode 2 cannot exploit all of the channel diversity and may result in a degraded performance compared to mode 3. For an embodiment of the invention where the link quality is greater than threshold AB_thresh_2, mode-3 may be selected as the transmission mode 430. For an embodiment of the invention where the link quality is not greater than threshold AB_thresh_2, mode-2 may be selected as the transmission mode 450. With the selection of the preferred transmission mode completed, the compound communication mode 400 may select additional configuration parameters in the manner previously detailed 440. The compound communication mode 400 may then transmit from node A to node B using the selected transmission mode and configuration 460.

Figure 5:
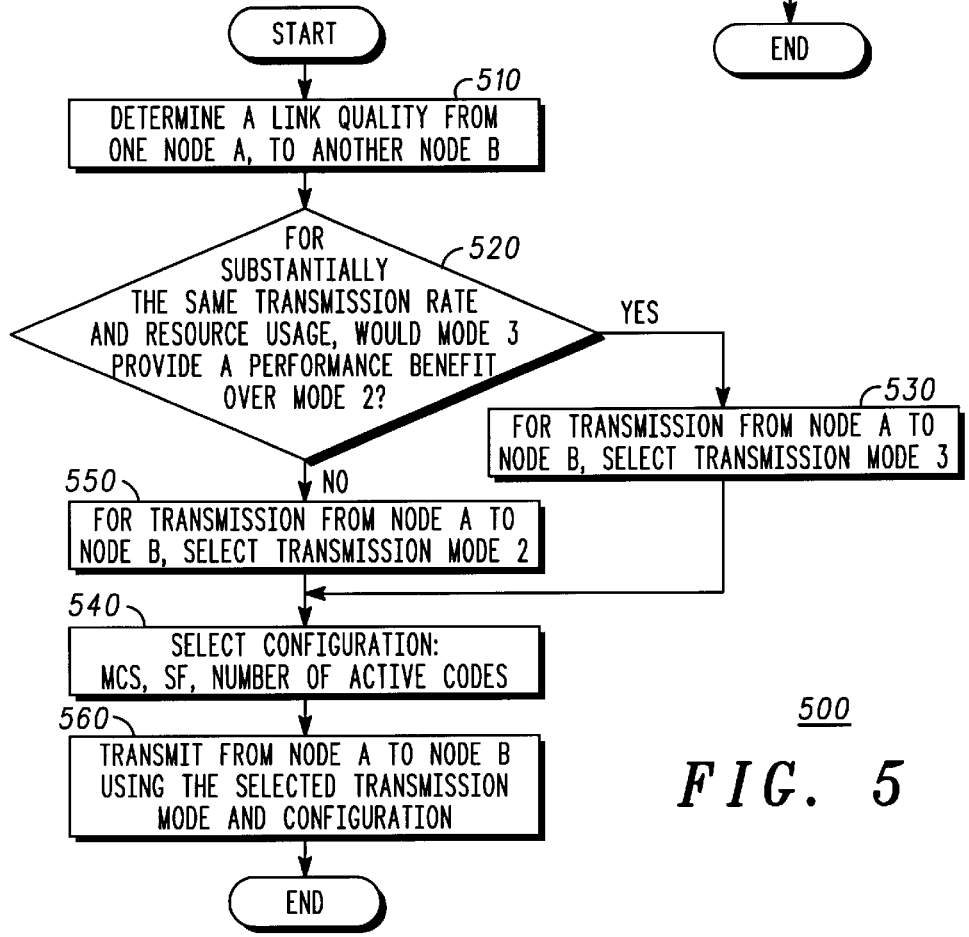
FIG. 5 is a flow chart representation of a third embodiment of the transmission selection method performed by the communication system of FIG. 1, in accordance with the present invention.

A further embodiment of the invention is illustrated as another embodiment of a compound communication mode 500 in FIG. 5. After determining a link quality from one node (node A) to a second node (node B) 510, the compound communication mode 500 may decide whether or not mode-3 can provide better performance than mode-2 when both are configured to have the same or virtually the same transmission rate and resource usage 520. If so, mode-3 may be selected for transmission from node A to node B 530. If no performance benefit is found to justify mode-3, mode-2 may be used for transmission from nodes A to B 550. Regardless of the selected transmission mode, additional configuration parameters may be selected in accordance with previously detailed embodiments 540. The compound communication mode 500 may conclude with the transmission from nodes A to B using the selected transmission mode and configuration 560.

Figure 6:
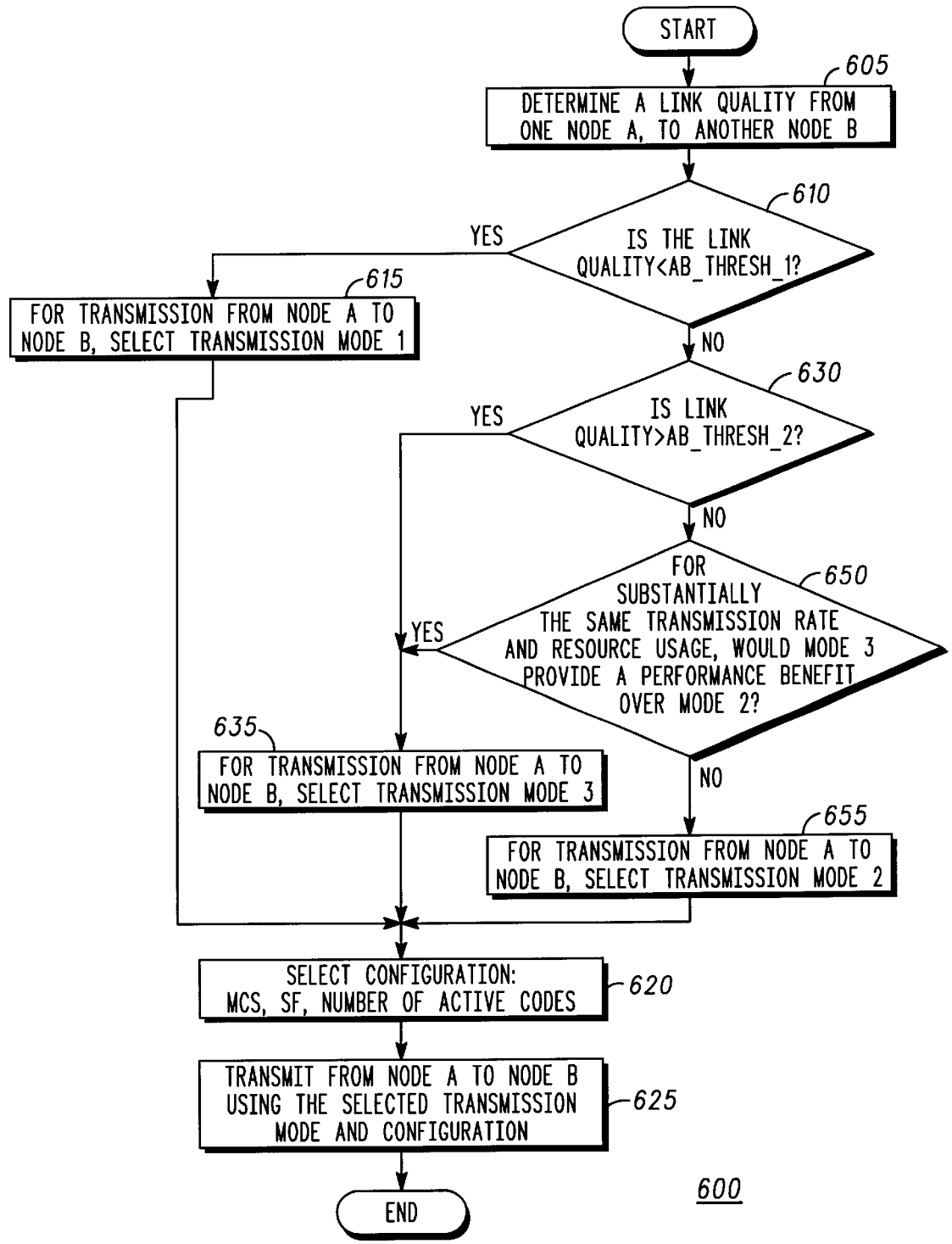
FIG. 6 is a flow chart representation of a fourth embodiment of the transmission selection method performed by the communication system of FIG. 1, in accordance with the present invention.

An additional embodiment of the invention is illustrated within the flowchart of FIG. 6 as another embodiment of a compound communication mode 600. Compound communication mode 600 may incorporate all or part of the methods from the previously described compound communication modes 200, 300, 400 and 500. FIG. 6 may begin with the determination of a link quality from nodes A to B 605. After determining the link quality 605, one embodiment of the invention may compare the link quality to a threshold value 610. The threshold value, denoted as AB_thresh_1, may correspond to the minimum required link quality for the lowest MCR from the MCS set. If the link quality is less than the AB_thresh_1 value, the transmission mode-1 may be selected 615. After selecting mode-1, the compound communication mode 600 may select additional configuration parameters 620. For one embodiment of the invention, additional configuration parameters may include in part or completely or in combination, from data not limited to MCS, spreading factor, and number of active spreading codes. Using the selected transmission mode-1 and the determined configuration, data may be transmitted from node A to node B 625.

If the compound communication mode 600 determines the link quality to be more or equal to the AB_thresh_1 value, the method may proceed to the block 630, where a determination may be made if the link quality is greater than the threshold AB_thresh_2. The threshold value, denoted as AB_thresh_2, may correspond to the required link quality for the highest rate MCR (from the MCS set) for which mode 2 cannot exploit all of the channel diversity and may result in a degraded performance compared to mode 3. For an embodiment of the invention where the link quality is greater than threshold AB_thresh_2, mode-3 may be selected as the transmission mode 635. With the selection of the preferred transmission mode completed, the compound communication mode 600 may select additional configuration parameters in the manor previously detailed 620. The compound communication mode 600 may then transmit from node A to node B using the selected transmission mode and configuration 625.

For an embodiment of the invention where the link quality is not greater than threshold AB_thresh_2 630, the compound communication mode 600 may decide whether or not mode-3 can provide better performance than mode-2 when both are configured to have the same or virtually the same transmission rate and resource usage 650. If so, mode-3 may be selected for transmission from node A to node B 635. If no performance benefit is found to justify mode-3, mode-2 may be used for transmission from nodes A to B 655. Regardless of the selected transmission mode, additional configuration parameters may be selected in accordance with previously detailed embodiments 620, and the compound communication mode 600 may conclude with the transmission from nodes A to B using the selected transmission mode and configuration 625. Another embodiment of the invention may provide that blocks 610 and 630, while remaining with their associated functionality, may be interchangeable.

An additional embodiment of the invention relates to systems that use automatic repeat requests (ARQ). Some forms of ARQ may transmit the original information in an uncoded form on the first attempt. If the original transmission contains any errors, some channel coding redundancy (e.g., parity bits) may be transmitted on the next attempt. In this embodiment of a wireless communication system, it may be advantageous to use multi-code MC-CDMA (Mode-3) for the first transmission. Then, re-transmissions can use regular OFDM, as appropriate. Another embodiment may use multi-carrier with spreading for the first transmission and then select multi-carrier with or without spreading for re-transmissions based on the link quality, similar to other embodiments of the invention.

The above-described methods and implementations of transmission mode selections and configurations are example methods and implementations. These methods and implementations illustrate one possible approach for encoding and decoding media sequences. The actual implementation may vary from the method discussed. Moreover, various other improvements and modifications to this invention may occur to those skilled in the art, and those improvements and modifications will fall within the scope of this invention as set forth below.

The present invention may be embodied in other specific forms without departing from its spirit or essential characteristics. The described embodiments are to be considered in all respects as illustrative and not restrictive.

We claim:

1. A method of operation for a variable modulation communication system comprising:

receiving a signal;

determining a link quality as a function of the received signal;

selecting a spreading factor, modulation, and coding as a function of the link quality; and transmitting an automatic repeat request, wherein a first transmission is made with a selected compound multi-carrier communication mode with spreading, and a second transmission is made using a compound multi-carrier communication mode that is selected as a function of the link quality.

2. A computer readable medium storing a computer program comprising:

computer readable code for receiving a signal;

computer readable code for determining a link quality as a function of the received signal;

computer readable code for selecting a spreading factor, modulation, and coding as a function of the link quality; and computer readable code for transmitting an automatic repeat request, wherein a first transmission is made with a selected spreading factor, modulation, and coding with spreading, and a second transmission is made using a spreading factor, modulation, and coding that is selected as a function of the link quality.

3. A method of operating a multi-carrier communication system, the method comprising the steps of:

determining a lint quality of a received signal;

selecting between a multi-carrier communication mode without spreading and a multi-carrier communication mode with spreading based on the link quality; and wherein the step of selecting between the multi-carrier communication mode without spreading and the multi-carrier communication mode with spreading comprises the step of selecting between the multi-carrier communication mode without spreading and the multi-carrier communication mode with a plurality of spreading modes;

wherein at least one spreading mode is configured to support a transmission mode that supports greater frequency diversity with a substantially similar data transmission rate as the non-spread mode.

4. The method of claim 3 further comprising the step of:

determining a modulation type, a channel coding, and a spreading factor based on the link quality.

5. The method of claim 4 further comprising the step of:

determining a number of active spreading codes based on the link quality.

6. The method of claim 3 further comprising the step of:

multiplexing transmissions for a plurality of nodes onto different sets of subcarriers.

7. The method of claim 3 wherein the step of selecting based on the link quality comprises the step selecting based on a comparison in performance of a non-spread mode and a spread mode.

8. The method of claim 3 wherein at least one spreading mode is configured to provide multi-carrier code division multiple access with fractional loading.

9. The method of claim 3 wherein at least one spreading mode is configured to provide single-code transmission with a variable spreading factor.

10. The method of claim 3 wherein at least one spreading mode is configured to provide multi-carrier transmission with spreading and multi-code, with a loading near one.

11. The method of claim 3 wherein the step of determining the link quality comprises the step of determining the link quality as a function of at least one parameter of the group consisting of signal to noise plus interference ratio, signal to noise ratio, signal to interference ratio, bit error rate, symbol error rate, word error rate, and frame error rate.

12. The method of claim 3 further comprising the step of:
adjusting at least one of the group consisting of the link quality and a link quality threshold, wherein the adjustment relates to a characteristic of the received signal used to determine the link quality.

13. The method of claim 3 further comprising:
determining a data detector type for a communication device; and adjusting at least one of the group consisting of the link quality and a link quality threshold, as a function of the type of data detector.

14. The method of claim 3 further comprising the step of transmitting at least one parameter of the selected multicarrier communication mode to a source of a received signal.

15. The method of claim 3 wherein the step of determining the link quality comprises the step of determining the link quality in a first communication device and wherein the method of claim 3 further comprises the step of:
transmitting the link quality to a second communication device, causing the second communication device to select between a multi-carrier communication mode without spreading or a multi-carrier communication mode with spreading based on the link quality.

16. The method of claim 3 wherein the multi-carrier communication mode without spreading includes an orthogonal frequency division multiplexing with adaptive modulation and coding.

17. A method of operating a multi-carrier communication system, the method comprising the steps of:
performing a first transmission using a multi-carrier communication mode with spreading;
performing a second transmission containing redundancy for the first transmission using a multi-carrier communication mode without spreading; and
wherein for the first transmission the multi-carrier communication mode with spreading is configured to support a transmission mode that supports greater frequency diversity with a substantially similar data transmission rate as a comparable multi-carrier communication mode without spreading.

18. A method of operating a multi-carrier communication system, the method comprising the steps of:
performing a first transmission using a multi-cater communication mode with spreading;
determining a link quality;
for a second transmission containing redundancy for the first transmission, selecting between a multi-carrier communication mode without spreading and a multi-carrier communication mode with spreading based on the link quality; and
wherein for the second transmission, the multi-carrier communication mode with spreading and the multi-carrier communication mode without spreading are configured to support substantially similar transmission rates.

19. A computer readable medium storing a computer program comprising:
computer readable code for determining a link quality of a received signal; and
computer readable code for selecting between a multi-carrier communication mode without spreading and a multi-carrier communication mode with spreading based on the link quality; and
wherein the multi-carrier communication mode with spreading is configured to support a transmission mode having a greater frequency diversity with a substantially similar data transmission rate as the non-spread mode.

20. A computer readable medium storing a computer program comprising:

computer readable code for performing a first transmission using a multi-carrier communication mode with spreading;
computer readable code for determining a link quality;
for a second transmission containing redundancy for the first transmission, computer readable code for selecting between a multi-carrier communication mode without spreading and a multi-carrier communication mode with spreading based on the link quality; and
wherein for the second transmission the multi-carrier communication mode with spreading and the multi-carrier communication mode without spreading are configured to support substantially similar transmission rates.

21. A computer readable medium storing a computer program comprising:
computer readable code for performing a first transmission using a multi-carrier communication mode with spreading; and
computer readable code for performing a second transmission containing redundancy for the first transmission using a multi-carrier communication mode without spreading; and
wherein for the first transmission the multi-carrier communication mode with spreading is configured to support a transmission mode that supports greater frequency diversity with a substantially similar data transmission rate as a comparable multi-carrier communication mode without spreading.

22. A method of operating a multi-carrier communication system, the method comprising the steps of:
determining a link quality of a received signal;
selecting between a multi-carrier communication mode without spreading and a multi-carrier communication mode with spreading based on the link quality; and
wherein the multi-carrier communication mode with spreading is configured to support a transmission mode having a greater frequency diversity with a substantially similar data transmission rate as the non-spread mode.

23. A method of operating a multi-carrier communication system, the method comprising the steps of:
determining a link quality of a received signal;
selecting between a multi-carrier communication mode without spreading and a multi-carrier communication mode with spreading based on the link quality; and
wherein the multi-carrier communication mode with spreading is configured to provide a transmission rate below a transmission rate provided by a smallest modulation and coding rate (MCR) for the multi-carrier communication mode without spreading.

24. The method of claim 23 wherein the multi-carrier communication mode with spreading is configured to provide multi-carrier code division multiple access with fractional loading.

25. The method of claim 23 wherein the multi-carrier communication mode with spreading is configured to provide single-code transmission with a variable spreading factor.

26. A method of operating a multi-carrier communication system, the method comprising the steps of;
determining a link quality of a received signal;
selecting between a multi-carrier communication mode without spreading and a multi-carrier communication mode with spreading based on the link quality;
wherein the step of selecting between the multi-carrier communication mode without spreading and the multi-carrier communication mode with spreading comprises the step of selecting between the multi-carrier communication mode without spreading and the multi-carrier communication mode with a plurality of spreading modes; and wherein at least one spreading mode is configured to provide a transmission rate below a transmission rate provided by a smallest modulation and coding rate (MCR) for the multi-carrier communication mode without spreading.

27. The method of claim 26 wherein at least one spreading mode from the plurality of spreading modes is configured to provide multi-carrier code division multiple access with fractional loading.

28. The method of claim 26 wherein at least one spreading mode from the plurality of spreading modes is configured to provide single-code transmission with a variable spreading factor.

* * * * *